Sept. 13, 1927.                                         1,642,404
                      M. BUCHHOLZ
       PROTECTIVE SYSTEM FOR LIQUID INSULATED ELECTRIC APPARATUS
                      Filed April 16, 1925
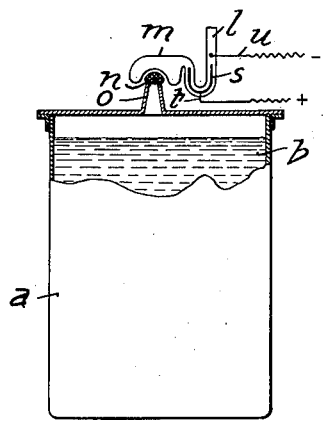
Inventor:
Max Buchholz
by 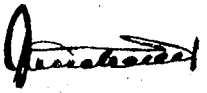
Atty.

Patented Sept. 13, 1927.

1,642,404

UNITED STATES PATENT OFFICE.

MAX BUCHHOLZ, OF CASSEL, GERMANY.

PROTECTIVE SYSTEM FOR LIQUID-INSULATED ELECTRIC APPARATUS.

Application filed April 16, 1925, Serial No. 23,678, and in Germany October 6, 1924.

My invention has reference to means for protecting electric apparatus operating in an insulating liquid, such as oil transformers, oil switches, grounding throttling coils, resistances and the like, and it is one of the important objects of my invention to provide a device of very simple construction and great reliability and adapted to operate before extensive injuries to the apparatus to be protected can occur by sparking, overloading or other disturbances.

My invention is particularly based on the fact that in the case of disturbances in the operation of the apparatus to be protected or in the case of sparking or other irregularities of operation, or whenever such irregularities are imminent, as well as in the case of any ebullition or fermentation processes in the oil, serving as an insulating liquid, bubbles of gases of decomposition are formed which can operate an electric contact, either a working or a closed contact, which is adapted to switch out of circuit the apparatus to be protected, or which will operate an alarm or annunciator device indicating the disturbance, or which is adapted to effect both kinds of operations.

The gases or vapors generated from insulating oils by decomposition are well known to contain a high percentage of hydrogen and methane which are known to suffer condensation in contact with certain substances, mostly metals, such as platinum black, which are heated in consequence of such condensation.

According to the present invention I utilize this rise of temperature for operating a mechanical or electric contact device arranged for operating a protective switch, alarm, annunciator device or the like adapted to cut out or to announce an unnormal condition of working of the transformer or other apparatus to be protected.

In the drawings affixed to this specification and forming part thereof an arrangement embodying my invention is illustrated diagrammatically by way of example.

In the drawings—

$a$ is a transformer vessel or container and $b$ is the insulating oil or other liquid filling same and surrounding the apparatus (not visible) to be protected, this insulating liquid developing gases or vapors containing hydrogen, methane or the like whenever the normal operation of the apparatus surrounded by it is disturbed. $c$ is the cover closing the container $a$ and $o$ and is a nozzle-like tubular extension mounted on said cover and communicating with the interior of the container. $n$ is a body of platinum black or other substance adapted to be heated in contact with the gases or vapors developed in the insulating liquid, this body being disposed above or in the tubular extension $o$. $m$ is a glass or other vessel mounted above and partly surrounding the body $n$ so as to be influenced by a rise of temperature in this body. The vessel $m$ is filled with air and a U-shaped tube $l$ is connected with it containing a body of mercury $s$. $t$ is one of the terminals of the protective circuit projecting into the bend of tube $l$ in permanent contact with the mercury, while $u$ is the other terminal projecting into the tube $l$ above the outer mercury level.

Obviously, on the body of platinum black $n$ being heated by larger quantities of gases or vapors, such as hydrogen or methane, escaping from the nozzle $o$, the heat emitted by the body $n$ will cause the air enclosed within the vessel $m$ to expand and the mercury $s$ to rise in the outer arm of tube $l$, thereby closing the contact $u$ and operating the protective circuit.

Instead of arranging the contact substance to be heated above or in a tubular extension such as $o$, I may also dispose it below the cover $c$ or in a tube connected with the apparatus to be protected.

In order to prevent ignition of the gases or vapors in the container $a$ in consequence of the rise of temperature occurring in contact with the body $n$, I can provide within the tube $o$ some suitable protective means such as for instance wire gauze, partitious or the like resembling those provided in the well known miners' lamps.

The circuit to be controlled by the contacts referred to may excite either directly or by the medium of an intermediate relay the releasing coil of an oil switch which interrupts the endangered circuit. In the case of apparatus the circuit of which does not include an oil switch, as frequently occurs, for instance in the cases of transformers mounted in the field at wide distances apart, other provisions should be made for the purposes of this invention.

Besides the form of construction herein shown and described, the invention is susceptible of a variety of other modifications and forms of application of the principle of my invention all of which operate substantially in a similar manner. The means of connecting the contacting device with the releasing circuit and the switching means are open to changes and alterations without any material importance for the operation of the apparatus according to my invention which in its broad aspects comprises the operation of safety devices for electric apparatus or the like, adapted for operation by vapors, fumes, gases or similar emanations liberated and expelled from the insulating medium, and means adapted to be operatively influenced by such emanations, and connected to fuses or equivalent safety means, the instrumentalities shown and described in this specification as embodiments of these principles being susceptible of modifications without deviating from the spirit of my invention as set forth in the claims.

In the claims the term "gases" is meant to comprise also vapors and fumes.

I claim:—

1. Protective system for liquid-insulated apparatus comprising a supply of insulating liquid which, when decomposed, forms gases containing an adsorbable gas, a substance capable, in contact with such gases to effect a rise of temperature and a protective means for the apparatus to be protected responsive to such rise of temperature.

2. Protective system for liquid-insulated apparatus comprising a supply of insulating liquid which, when decomposed, forms gases containing an adsorbable gas, a substance capable, in contact with such gases, to effect a rise of temperature and a protective circuit responsive to such rise of temperature.

3. Protective system for liquid-insulated apparatus comprising a supply of insulating liquid which, when decomposed, forms gases containing an adsorable gas, a substance capable, in contact with such gases, to effect a rise of temperature, a protective circuit and means for varying the operative conditions of said circuit, said varying means being arranged to be operated by such rise of temperature.

4. Protective system for liquid-insulated apparatus comprising a supply of insulating liquid which, when decomposed, forms gases containing an adsorbable gas, a substance capable, in contact with such gases, to effect a rise of temperature, a protective circuit, an air-filled vessel heated by said substance and a mercury contact connected with the interior of said vessel.

5. The method of controlling abnormal working conditions of liquid insulated apparatus which comprises subjecting a substance adapted to be heated by the adsorption of gases to the influence of gases developed in the insulating liquid in consequence of abnormal conditions, and causing the resultant temperature change to vary the operative condition of a protective means.

6. The method of controlling abnormal working conditions of liquid insulated apparatus which comprises subjecting a substance adapted to be heated by the adsorption of gases to the influence of gases developed in the insulating liquid in consequence of abnormal conditions, and causing the resultant temperature change to vary the operative condition of a protective circuit.

In testimony whereof I affix my signature.

MAX BUCHHOLZ.